(12) United States Patent
Wheeler et al.

(10) Patent No.: US 9,410,303 B2
(45) Date of Patent: Aug. 9, 2016

(54) APPARATUS FOR DRILLING SITE CONTAINMENT

(71) Applicants: Matthew Wheeler, Longview, TX (US); Lee Honeycutt, Longview, TX (US); Chris Allen, Columbia Crossroads, PA (US)

(72) Inventors: Matthew Wheeler, Longview, TX (US); Lee Honeycutt, Longview, TX (US); Chris Allen, Columbia Crossroads, PA (US)

( * ) Notice: Subject to any disclaimer, the term of this patent is extended or adjusted under 35 U.S.C. 154(b) by 0 days.

(21) Appl. No.: 14/664,403

(22) Filed: Mar. 20, 2015

(65) Prior Publication Data
US 2015/0191889 A1    Jul. 9, 2015

Related U.S. Application Data

(63) Continuation of application No. 13/688,517, filed on Nov. 29, 2012, now Pat. No. 9,016,980.

(51) Int. Cl.
| | |
|---|---|
| *B65D 90/24* | (2006.01) |
| *E21B 41/00* | (2006.01) |
| *E02D 31/00* | (2006.01) |
| *B09C 1/00* | (2006.01) |
| *B08B 17/02* | (2006.01) |
| *B65G 3/04* | (2006.01) |
| *E04H 7/02* | (2006.01) |

(52) U.S. Cl.
CPC ............ *E02D 31/004* (2013.01); *B08B 17/025* (2013.01); *B09C 1/00* (2013.01); *B65D 90/24* (2013.01); *B65G 3/04* (2013.01); *E04H 7/02* (2013.01); *E21B 41/00* (2013.01)

(58) Field of Classification Search
CPC ........ B65D 90/24; E02D 31/004; B09C 1/00; E21B 41/00
See application file for complete search history.

(56) References Cited

U.S. PATENT DOCUMENTS

| | | | | |
|---|---|---|---|---|
| 5,454,195 A * | 10/1995 | Hallsten | ............... | B65D 90/24 220/495.01 |
| 5,689,920 A * | 11/1997 | Hallsten | ............... | B65D 90/24 220/495.01 |
| 6,258,430 B1 * | 7/2001 | Perlman | ............... | E04H 6/428 180/69.1 |
| 6,695,534 B2 * | 2/2004 | Cain | ............... | B65D 90/24 405/114 |
| 9,016,980 B2 * | 4/2015 | Wheeler | ............... | B09C 1/00 405/129.45 |
| 2004/0096276 A1 * | 5/2004 | Startteim | ............... | E02D 27/01 405/129.8 |
| 2012/0076588 A1 * | 3/2012 | Dupuis | ............... | F01M 11/03 405/107 |
| 2013/0105475 A1 * | 5/2013 | Marshall | ............... | B65D 90/24 220/4.12 |
| 2013/0121768 A1 * | 5/2013 | Powell | ............... | E02D 31/00 405/114 |

* cited by examiner

*Primary Examiner* — Frederick L Lagman
(74) *Attorney, Agent, or Firm* — Conley Rose, P.C.; Grant Rodolph

(57) ABSTRACT

An apparatus for protecting against environmental contamination at a drilling site is disclosed. The apparatus is used to form a perimeter around the drilling site, the interior of which is covered by a geomembrane. The portion of the geomembrane found along the perimeter is placed in the groove of the apparatus's base. A key block is then fit into the groove, thereby holding the geomembrane in place by the tension created between the base and the key block. At those perimeter locations that will be traversed by vehicles and equipment, two ramp pieces replace the key block in holding the geomembrane tight against the base.

18 Claims, 5 Drawing Sheets

APPARATUS FOR DRILLING SITE CONTAINMENT

CROSS-REFERENCE TO RELATED APPLICATIONS

The present application is a continuation application of U.S. patent application Ser. No. 13/688,517 filed on Nov. 29, 2012 by Wheeler, et al. and entitled "Apparatus for Drilling Site Containment," now U.S. Pat. No. 9,016,980, the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Field of Invention

The present invention relates to apparatuses used to protect against environmental contamination at drilling sites. In particular, the present invention relates to apparatuses designed to place a barrier between the environment and any contamination that may be created from drilling operations.

2. Description of Related Art

There is a need to prevent environmental contamination at drilling sites. Due to the dramatic increase in hydraulic fracturing—popularly known as "fracking"—currently taking place in the United States and around the world coupled with the toxic fluid used in such drilling increase the risk for contamination at drilling sites. In addition to the fracking fluid, there are large quantities of fuel, drilling mud, corrosives and flowback water present at many drilling sites. Spills of any of these liquids must be reported to regulatory agencies, and the contaminated soil and water must be remediated. To reduce the amount of contaminated soil and water and to eliminate regulatory fines, many drillers excavate the site, cover it with stone or crushed rock, place a geotextile over the crushed rock, and then loosely place a geomembrane over the surface.

Once the layers are installed at the well site, the geomembrane is pulled over earthen berms, railroad ties or corrugated pipe to form containment walls around the perimeter. The geomembrane then contains the leaks and spills for subsequent removal (e.g., by vacuum). There are problems inherent with the afore-described containment systems. Earthen berms, railroad ties and corrugated pipe do not hold the geomembrane firmly in place, causing the geomembrane to fold up or bunch which creates mounds that have to be stepped and driven over. Moreover, such items cannot be placed entirely around the perimeter of the drilling site since entryways need to be in place for trucks and equipment to get to the drilling rig and other machines at the drilling site. This further weakens the positioning of geomembrane and leads to the mounds described above. Accordingly, there is a need for an apparatus that will stabilize the geomembrane to keep it from folding and bunching, while at the same time allowing vehicles and equipment to traverse containment walls that are created by the apparatus.

SUMMARY

The present invention solves the aforementioned deficiencies. The present invention comprises a base, a key block, and a ramp, all constructed out of a solid and durable material. The base is comprised of a groove running along its length. The base is laid on the ground in a face-up position along the entire perimeter of the drilling site that will be contained. The geomembrane is then rolled out and stretched across the drilling site and on top of the base. Once the geomembrane is in position, the key block is placed over the geomembrane and on top of the groove so that is can be pressed into the groove. When the top of the key block is flush with the top of the base, the friction created inside the groove holds the geomembrane in place. In those places along the perimeter that will be traversed by vehicles and equipment, a ramp is used instead of a key block to hold the geomembrane. The ramp is comprised of two separate but identical pieces that are comprised of a downward-facing tongue at one end and an incline at the opposite end. To use the ramp, the pieces are position to face each other with the downward-facing tongue of each piece positioned over the groove of the base. The tongues are then pressed into the groove until the entire space of the groove is occupied. When in place, the ramp provides a means for vehicles and equipment to traverse the perimeter of the containment system while still holding the geomembrane in place.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
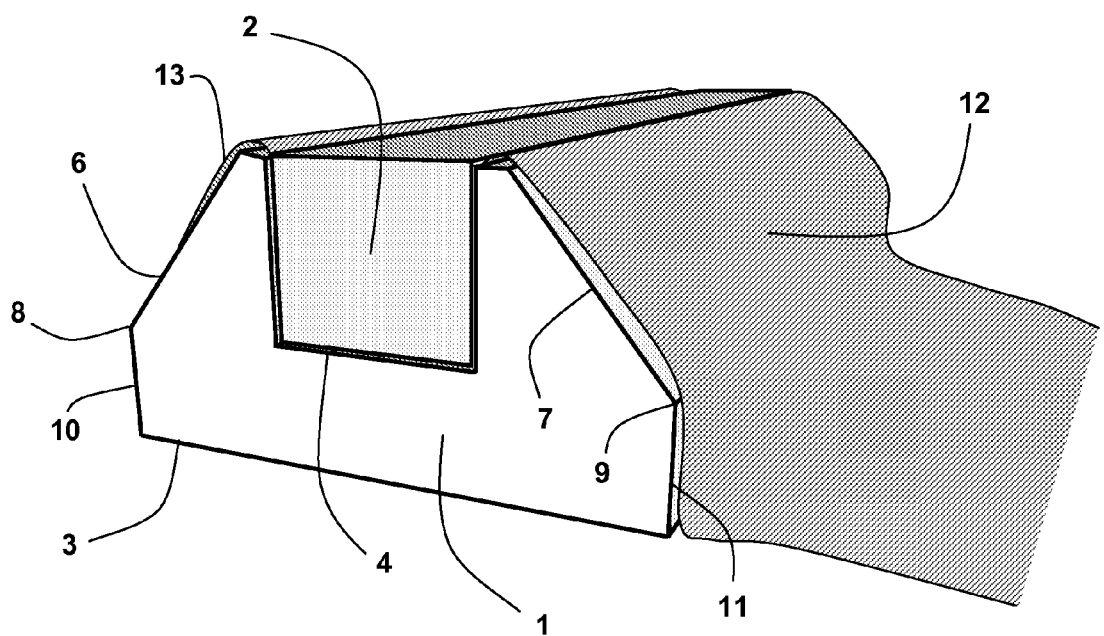
FIG. 1 is a perspective view of an apparatus consistent with the present invention.
Figure 2:
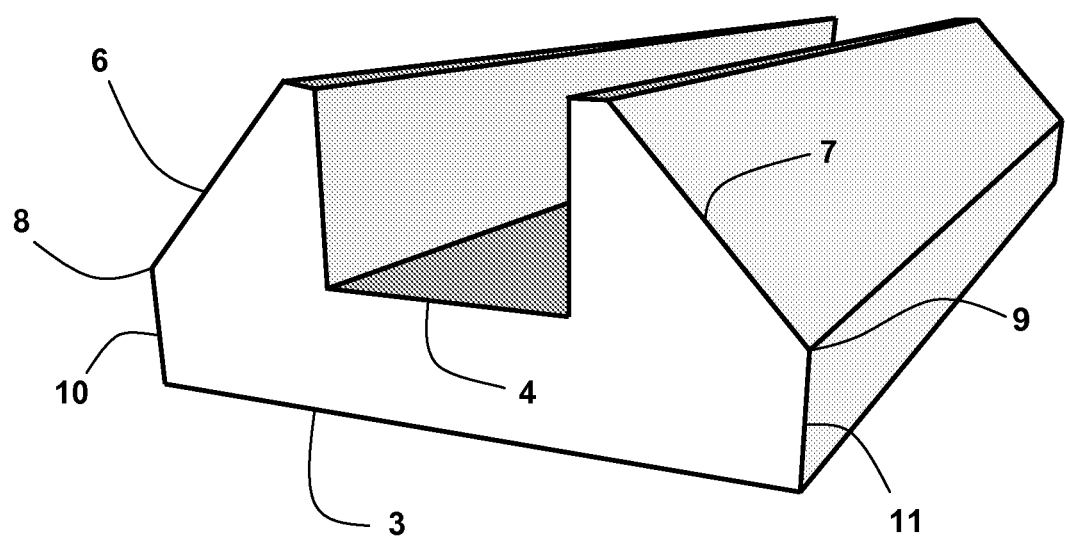
FIG. 2 is a perspective view of a base embodying features of the present invention.

Referring to FIGS. 1 and 2, one embodiment of the present invention comprises a base 1 and a key block 2. The base 1 and key block 2 may be constructed out of any known solid, durable material, but certain preferred embodiments of these elements are constructed out of a recycled rubber material commercially known as ENVIROform™, a product manufactured and sold by Tire Conversion Technologies, Inc. The base 1 comprises a flat bottom surface 3 that will be placed against on the ground at the perimeter of the containment area of the drilling site. The base 1 further comprises a substantially 90° groove 4 that is open towards the top surface 5 of the base 1. The groove 4 shown in FIG. 2 is 5" deep and 7" wide, but any dimensions for the groove 4 will be consistent with the present invention. Both sides of the base 1 comprise a sloped wall (6, 7) running parallel with the groove 4. The sloped walls (6, 7) may be sloped at any angle relative to the vertical and horizontal planes of the base 1, but are preferably sloped at substantially 45°, as is shown in FIG. 2. In preferred embodiments, a joint between the bottom edge (8, 9) of the sloped walls (6, 7) and the bottom surface 3 is formed by side walls (10, 11) running perpendicular to the bottom surface 3 and parallel with the groove 4.

Figure 3:
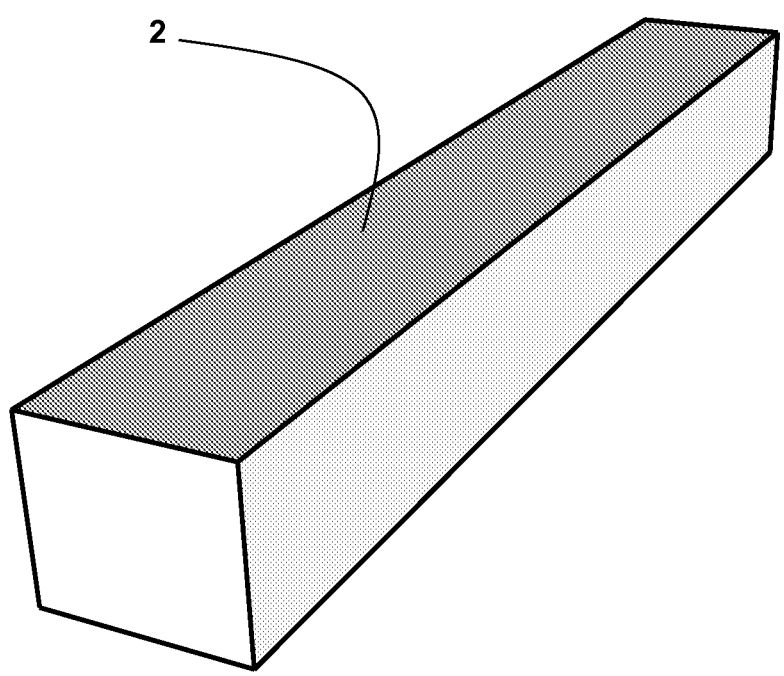
FIG. 3 is a perspective view of a key block embodying features of the present invention.

Referring to FIG. 3, the key block 2 is preferably rectangular cuboid in shape, but any three-dimensional shape capable of fitting snuggly into the groove of the base can be used. In preferred embodiments, the length of each section of key block 2 is substantially equal to the length of each section of base forming the perimeter around the containment area of the drilling site.

Referring back to FIG. 1, when in use, sections of base 1 are laid on the ground to form a complete perimeter around the containment area of the drilling site. One or more layers of geomembrane 12 are then laid to cover the containment area of the drilling site. At the perimeter, the geomembrane 12 is pulled over the base 1 so that it lays on top of the base 1—above the groove 4—and a portion 13 of the geomembrane 12 extends beyond the base 1. The section of key block 2 matching the section of base 1 is then inserted into the groove 4 and thereby forces the portion 13 of geomembrane 12 placed above the groove 4 and beyond the base 1 down into the groove 4. When the key block 2 is fully inserted into the groove 4, the tension created between the groove 4 and key block 2 holds the geomembrane 12 in the groove 4. To remove the geomembrane 12 from the drilling site, the key block 2 is simply pulled out from the groove 4, which releases the tension holding the geomembrane 12 in place.

Figure 4:
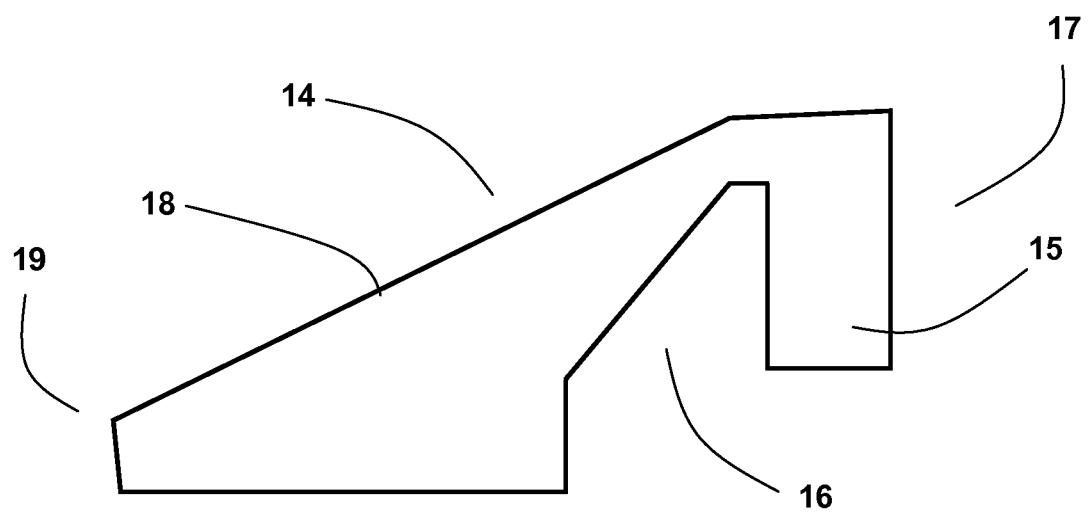
FIG. 4 is a side view of a ramp embodying features of the present invention.

Referring to FIG. 4, preferred embodiments of the present invention further comprise a ramp 14. As shown in FIG. 4, the ramp 14 comprises a tongue 15 and groove 16 along one end 17, and a sloped side 18 along the opposite end 19 of the ramp 14. The tongue 15 and groove 16 are respectfully shaped to snuggly fit into the groove of the base. The sloped side 18 of the ramp 14 can be sloped at any angle, but is preferably sloped at a mild incline to allow vehicles and equipment to climb the sloped side 18 of the ramp 14 with little risk of tipping or being unable to reach the summit of the ramp 14. The ramp 14 may be constructed of any known solid, durable material, but preferred embodiments of the ramp 14 are constructed out of a recycled rubber material commercially known as ENVIROform™, a product manufactured and sold by Tire Conversion Technologies, Inc.

Figure 5:
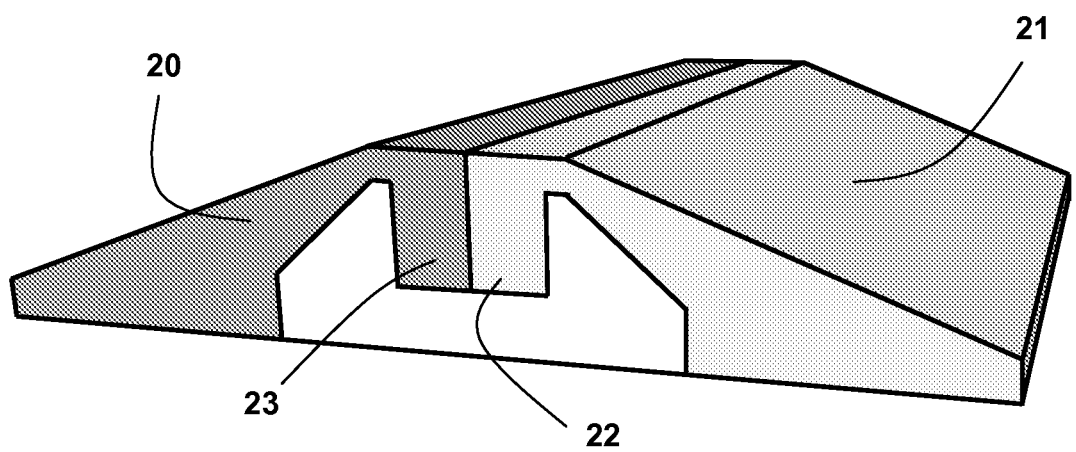
FIG. 5 is a perspective view of a ramp embodying features of the present invention.

Referring now to FIG. 5, a section of the present invention making use of the ramp is shown. Instead of using a key block, two opposing ramps (20, 21) are positioned with their respective tongues (22, 23) placed over the groove 4 of the base 1. The tongues (22, 23) are then inserted into the groove 4 of the base 1 to create a snug fit between the base 1 and the two opposing sections of ramp (20, 21). The tongues (22, 23) of the opposing ramps (20, 21) function as the key block would if it were in use, and holds the geomembrane in place against the base 1. The opposing sections of ramp (20, 21) allow vehicles and equipment to traverse the perimeter of the containment area of the drilling site without having to use a gate or similar device while at the same time keeping the geomembrane in place.

While the invention has been described in conjunction with specific embodiments thereof it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

What is claimed is:

1. An apparatus for containing a liquid, comprising:
   a sheet material;
   a base comprising a bottom surface, a top surface, and a groove disposed in the top surface; and
   a key block shaped to fit in the groove of the base and configured to create tension between the groove and the key block to hold the sheet material in the groove,
   wherein at least one edge of a top surface of the key block is substantially flush with the top surface of the base when the key block is placed in the groove, and
   wherein the groove comprises at least one surface that is oriented at a substantially 90 degree angle to the top surface.

2. The apparatus of claim 1, wherein the base comprises a sloped wall on each of two opposing side surfaces.

3. The apparatus of claim 2, wherein the sloped walls are disposed substantially parallel with the groove.

4. The apparatus of claim 1, wherein the base and the key block are made out of at least one of wood, metal, rubber, and a recycled rubber material, and wherein the sheet material is a geomembrane.

5. The apparatus of claim 1, further comprising:
   a plurality of the bases disposed around a perimeter of a drilling site; and
   a plurality of the key blocks disposed within the grooves of the plurality of bases and configured to hold the sheet material in place to substantially cover the drilling site.

6. An apparatus for containing a liquid, comprising:
   a sheet material;
   a base comprising a bottom surface, a top surface, and a groove disposed in the top surface; and
   at least one ramp comprising a tongue, wherein the tongue is shaped to fit in the groove of the base and create tension between the groove and the tongue to hold the sheet material in the groove,
   wherein the groove comprises at least one surface that is oriented at a substantially 90degree angle to the top surface.

7. The apparatus of claim 6, wherein the groove is polygonal in shape.

8. The apparatus of claim 6, wherein the tongue comprises at least one surface that is oriented at a substantially 90 degree angle to a top surface of the ramp.

9. The apparatus of claim 6, wherein the base and the ramp are made out of at least one of wood, metal, rubber, and a recycled rubber material, and wherein the sheet material is a geomembrane.

10. The apparatus of claim 6, wherein the ramp comprises two opposing ramp sections.

11. The apparatus of claim 10, wherein each of the two opposing ramp sections comprise the tongue configured to fit in the groove and create tension between the groove and the tongues to hold the sheet material in the groove.

12. The apparatus of claim 11, further comprising:
   a plurality of the bases disposed around a perimeter of a drilling site; and
   a plurality of the ramps disposed within the grooves of the plurality of bases and configured to hold the sheet material in place to substantially cover the drilling site.

13. A method of containing a liquid, comprising:
   providing a plurality of bases around a perimeter of a drilling site, each base comprising a bottom surface, a top surface, and a groove disposed in the top surface;
   providing a plurality of key blocks shaped to fit in the grooves;
   covering the drilling site and at least a portion of each groove with a sheet material;
   inserting the key blocks into the grooves to create tension between the grooves and the key blocks to hold the sheet material in the grooves,
   wherein each key block comprises a tongue of a ramp.

14. The method of claim 13, further comprising covering the drilling site and at least a portion of each groove with a plurality of layers of sheet material.

15. The method of claim 13, wherein the length of each of the plurality of key blocks is substantially equal to the length of each base.

16. The method of claim 13, wherein the ramps are configured to allow a vehicle to traverse the perimeter of the drilling site.

17. The method of claim 13, further comprising removing the plurality of key blocks from the grooves to release the sheet material.

18. The method of claim 13, wherein at least one edge of a top surface of at least some of the key blocks is substantially flush with the top surface of at least some of the bases when the key blocks are placed in the grooves.

* * * * *